United States Patent
El-Hassan et al.

(10) Patent No.: US 10,666,366 B2
(45) Date of Patent: May 26, 2020

(54) REVERSE COUPLER FOR TRANSCEIVER DEVICES

(71) Applicant: Apple Inc., Cupertino, CA (US)

(72) Inventors: Wassim El-Hassan, San Jose, CA (US); Yingjie Xu, Shanghai (CN)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/026,808

(22) Filed: Jul. 3, 2018

(65) Prior Publication Data

US 2020/0014472 A1 Jan. 9, 2020

(51) Int. Cl.
| | |
|---|---|
| H04B 17/00 | (2015.01) |
| H04B 17/15 | (2015.01) |
| H04B 17/29 | (2015.01) |
| H04B 1/40 | (2015.01) |

(52) U.S. Cl.
CPC ............. *H04B 17/15* (2015.01); *H04B 1/40* (2013.01); *H04B 17/29* (2015.01)

(58) Field of Classification Search
CPC ........... H04B 17/15; H04B 17/29; H04B 1/40
See application file for complete search history.

(56) References Cited

U.S. PATENT DOCUMENTS

| | | | | |
|---|---|---|---|---|
| 6,670,849 | B1 * | 12/2003 | Damgaard | ............... H03F 1/02 330/129 |
| 6,795,712 | B1 * | 9/2004 | Vakilian | ............... H03F 1/0211 370/335 |
| 7,369,871 | B2 * | 5/2008 | Vakilian | ............... H03F 1/0211 455/126 |
| 8,140,113 | B2 | 3/2012 | Rofougaran | |
| 9,182,951 | B1 | 11/2015 | Ormerod et al. | |
| 2005/0009480 | A1 * | 1/2005 | Vakilian | ............... H03F 1/0211 455/127.2 |
| 2009/0042521 | A1 * | 2/2009 | Otaka | .................. H04B 1/0475 455/126 |
| 2010/0112943 | A1 * | 5/2010 | Chia | .................... H01Q 1/2216 455/41.2 |
| 2015/0092825 | A1 * | 4/2015 | Gao | ....................... H04L 1/243 375/224 |
| 2016/0315659 | A1 | 10/2016 | Henry et al. | |
| 2017/0177898 | A1 | 6/2017 | Dillenberger | |
| 2018/0077711 | A1 | 3/2018 | Bowers et al. | |

OTHER PUBLICATIONS

Examination Report for Australian Patent Application No. 2019204764 dated Mar. 16, 2020; 3 pgs.

* cited by examiner

*Primary Examiner* — Sonny Trinh

(74) *Attorney, Agent, or Firm* — Fletcher Yoder, P.C.

(57) ABSTRACT

An electronic device may include a feedback circuit that may determine an error of a first signal to be transmitted to a second electronic device. The electronic device may also include a transceiver that may adjust the first signal based on the error and send the adjusted first signal to the second electronic device. The electronic device may also include a coupler circuitry configured to route a second signal received from the second electronic device or a third electronic device to the feedback circuit, such that the feedback circuit may determine one or more properties associated with the second signal.

20 Claims, 8 Drawing Sheets

REVERSE COUPLER FOR TRANSCEIVER DEVICES

BACKGROUND

The present disclosure relates generally to cellular and wireless devices and, more particularly, to cellular and wireless devices having transmitters and receivers capable of transmitting and receiving signals via the same electronic device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters are commonly included in various electronic devices, and particularly, portable electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. Certain types of transmitters, known as wireless transmitters, may be used to generate wireless signals to be transmitted by way of an antenna coupled to a power amplifier in the transmitter. The power amplifier of the transmitter may apply a suitable gain to a signal to increase the signal's strength for better transmission over a channel (e.g., air).

To test the signal quality of a transmitted signal, receiver devices may acquire the transmitted signal via the channel from the transmitter. After receiving the signal, the receiver device may perform certain types of analyses to determine various properties of the received signal. With this in mind, the testing operations for analyzing the signal quality of a transmitting device may often involve using two separate devices designed either to transmit signals or receive signals. However, the use of two different types of devices to perform the transmission and reception of signals may be an inefficient use of resources.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

As described in greater detail below, an electronic device may include coupler circuitry that directs signals to be transmitted and signals that are received by the same device to different circuit components. That is, in some embodiments, an electronic device may include feedback receiver circuit that may determine whether a signal being transmitted by the electronic device has certain expected properties (e.g., amplitude, phase). The feedback receiver circuit may thus receive a feedback signal representative of the signal being transmitted, compare the feedback signal to an expected signal, and adjust certain properties of the signal being transmitted to reduce an error between the feedback signal and the expected signal. The adjusted signal may then be transmitted out via an antenna to a receiving electronic device.

With the foregoing in mind, in some embodiments, coupler circuitry of the electronic device may include one or more switches that causes the feedback receiver circuit to receive a signal that has been received by the respective electronic device, instead of being produced by the respective electronic device. That is, the couple circuitry may adjust the position of a switch to cause the respective electronic device to receive a signal via a channel (e.g., air) and route the received signal to the feedback receiver circuit described above. The feedback receiver circuit may compare the received signal to an expected signal to determine the quality of the signal transmitted from another electronic device. By employing the same electronic device to determine the signal quality of a received signal and a signal generated for transmission, the present embodiments described herein may reduce the costs associated with creating separate devices for testing the transmission and reception of signals.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
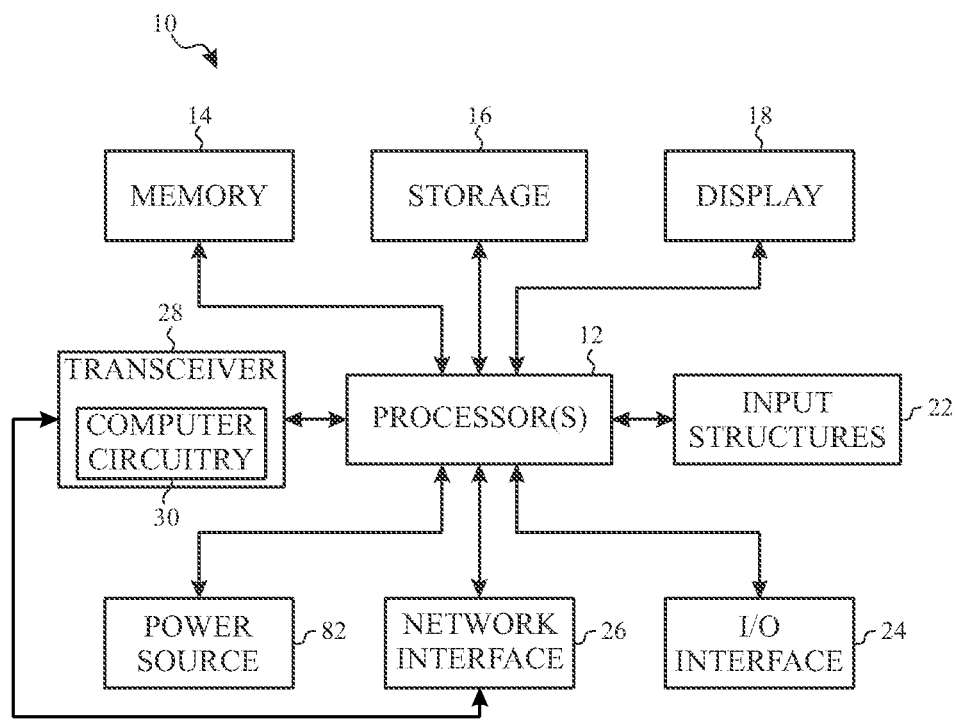
FIG. 1 is a schematic block diagram of an electronic device including a transceiver, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As briefly discussed above, an electronic device may include a transceiver circuit that enables the electronic device to transmit and receive signals via a channel (e.g., air). To ensure that a desired signal is generated and transmitted via the electronic device, the electronic device may include feedback receiver circuit that compares the generated signal to be transmitted to an expected signal. Based on an error (e.g., difference) between the generated signal and the expected signal, the feedback receiver circuit may determine compensation or adjustment factors to incorporate into the generated signal to ensure that the signal transmitted by the electronic device accurately represents the desired signal. Transceiver circuitry may then adjust the generated signal based on the compensation factors and transmit the adjusted signal via an antenna.

In certain embodiments, the electronic device described above may include coupler circuitry that enable the electronic device to test the quality of signals received by the electronic device. That is, in some embodiments, the coupler circuitry may include switches that route the signals received by the electronic device to the feedback receiver circuit, which may then assess the quality of the received signal. In other words, the coupler circuitry of the electronic device may include one or more switches that causes the feedback receiver circuit to receive a signal that has been received by the respective electronic device, instead of being produced by the respective electronic device. In this way, the couple circuitry may adjust the position of the switches to cause the respective electronic device to receive a signal via a channel (e.g., air) and route the received signal to the feedback receiver circuit, as described above, or perform the signal adjustment operations for internally generated signals, as mentioned above.

With respect to the received signal, the feedback receiver circuit may compare the received signal to an expected signal to determine the quality of the signal transmitted from another electronic device. By employing the same electronic device to determine the signal quality of a received signal and a signal generated for transmission, the present embodiments described herein may reduce the costs associated with creating separate devices for testing the transmission and reception of signals.

By way of introduction, FIG. 1 illustrates a block diagram of an example electronic device 10 that may be used in accordance with the embodiments described herein. In certain embodiments, the electronic device 10 may include, among other things, one or more processor(s) 12, memory 14, nonvolatile storage 16, a display 18, input structures 22, an input/output (I/O) interface 24, a network interface 26, a transceiver 28, coupler circuitry 30, and a power source 32. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
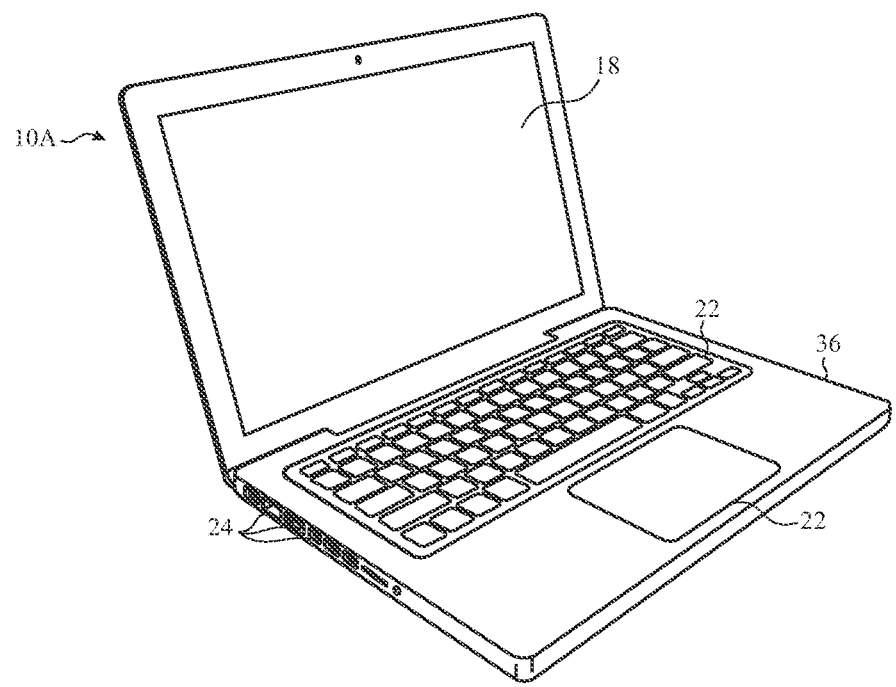
FIG. 2 is a perspective view of a notebook computer representing an embodiment of the electronic device of FIG. 1.
Figure 3:
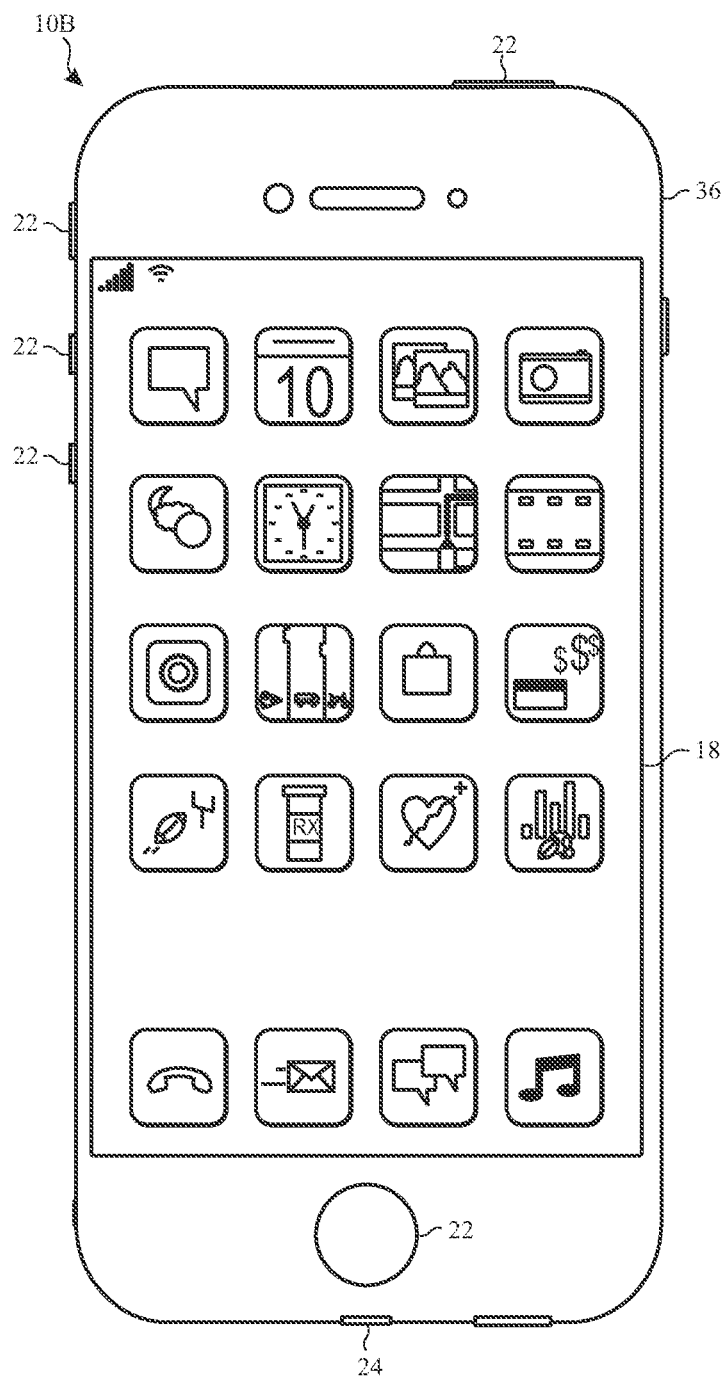
FIG. 3 is a front view of a hand-held device representing another embodiment of the electronic device of FIG. 1.
Figure 4:
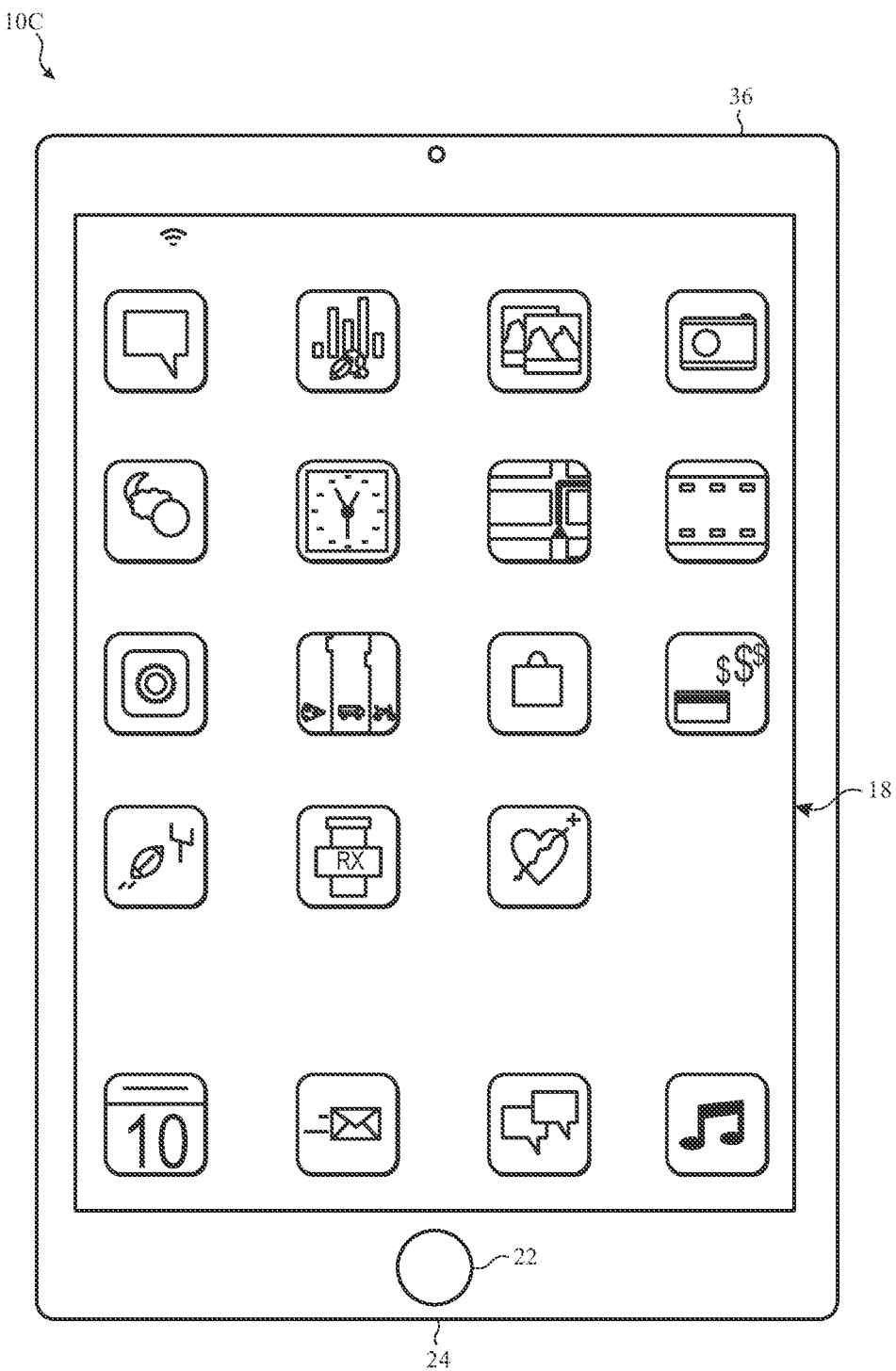
FIG. 4 is a front view of another hand-held device representing another embodiment of the electronic device of FIG. 1.
Figure 5:
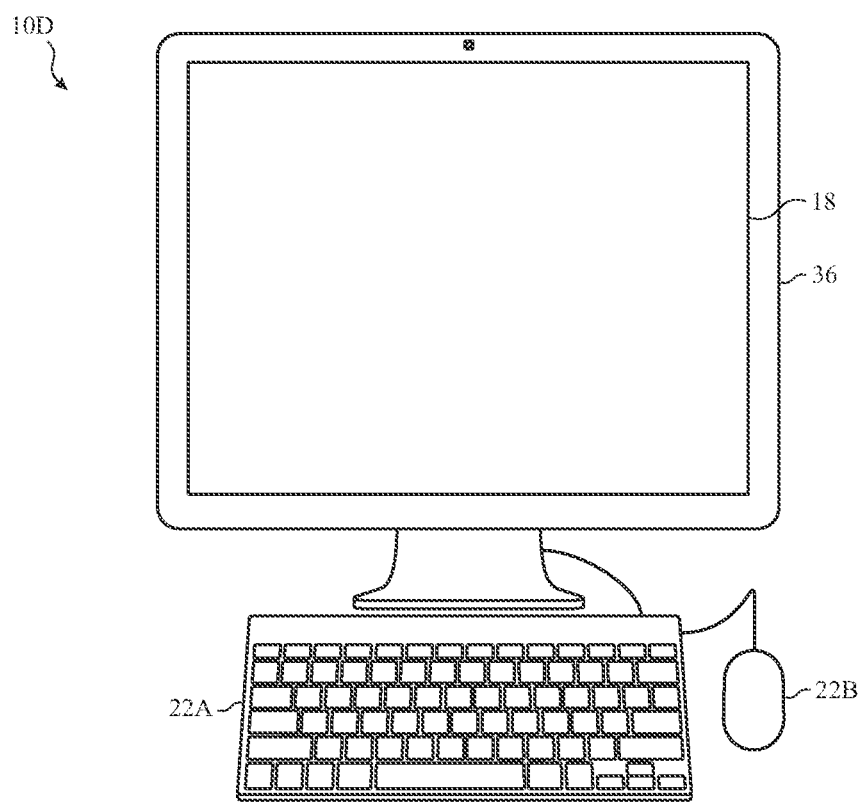
FIG. 5 is a front view of a desktop computer representing another embodiment of the electronic device of FIG. 1.
Figure 6:
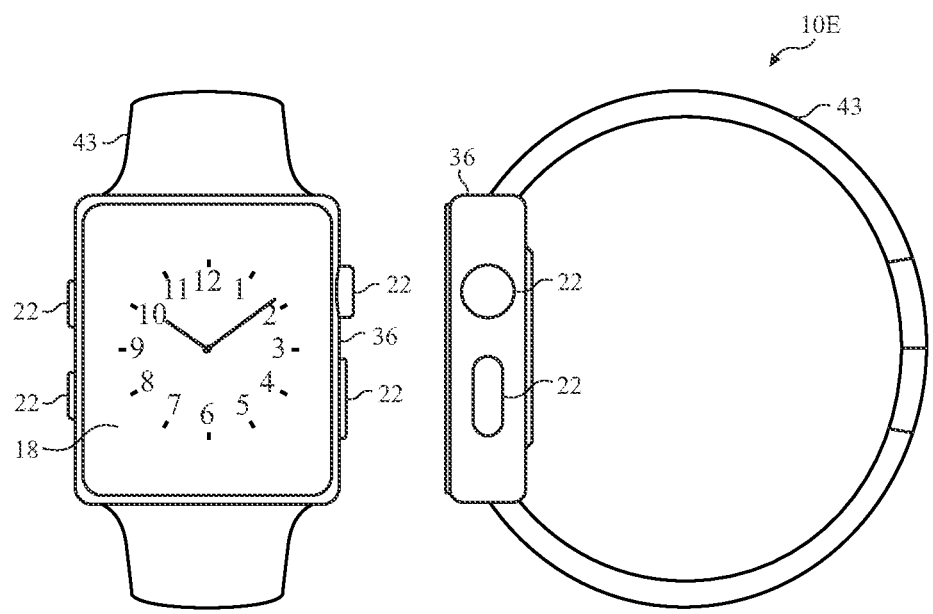
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, long term evolution (LTE) cellular network, long term evolution enhanced license assisted access (LTE-eLAA) cellular network, or long term evolution advanced (LTE-A) cellular network, which may involve ULCA. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE, LTE-eLAA, and LTE-A cellular networks), WiMAX networks, mobile WiMAX networks, ADSL and VDSL networks, DVB-T and DVB-H networks, UWB networks, and so forth.

The transceiver 28 may also include coupler circuitry 30 that may control the direction in which one or more signals are distributed within the electronic device 10. As will be discussed in more detail below, the coupler circuitry 30 may include one or more switches that route signals generated for transmission to a feedback receiver circuit, which determines whether the generated signal matches a desired signal. The feedback receiver circuit or the transceiver 28 may then adjust the generated signal to compensate for any discrepancies (e.g., error) between the two signals. The transceiver 28 may then transmit the adjusted signal via an antenna or the like, such that another suitable electronic device may receive the transmitted signal.

The coupler circuitry 30 may also position the switches to route signals received from other electronic devices to the feedback receiver circuit. In this way, the feedback receiver circuit may assess the quality of the received signal.

As further illustrated, the electronic device 10 may include a power source 32. The power source 32 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
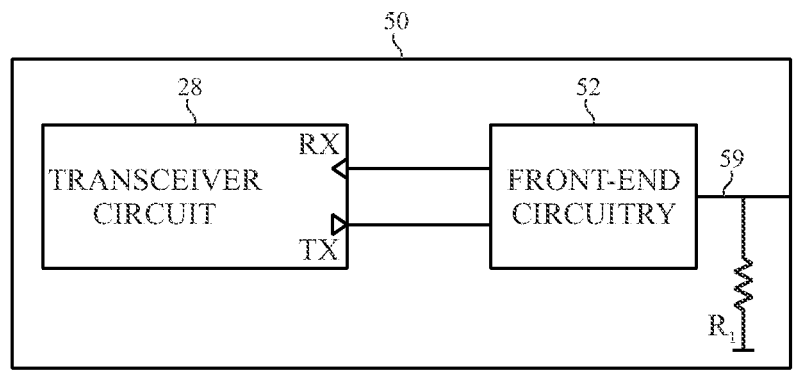
FIG. 7 is a schematic block diagram of an embodiment of the electronic device of FIG. 1 including a transceiver.

As previously noted above, each embodiment (e.g., notebook computer 10A, handheld device 10B, handheld device 10C, computer 10D, and wearable electronic device 10E) of the electronic device 10 may include the transceiver 28 described above. With the foregoing in mind, FIG. 7 depicts a schematic block diagram of an embodiment of components of an electronic device 50 that may be employed for transmitting signals to other suitable electronic devices that may be capable of receiving the transmitted signals. It should be noted that the electronic device 50 may correspond to the electronic device 10 described above and may be capable of both receiving and transmitting signals. To facilitate the transmission and reception of signals, the electronic device 50 may include the transceiver 28, a load resistor $R_1$, and front-end circuitry 52, which may perform some signal data processing operations. The load resistor $R_1$ may facilitate the transmission and reception of signals to and from the electronic device 50.

Figure 8:
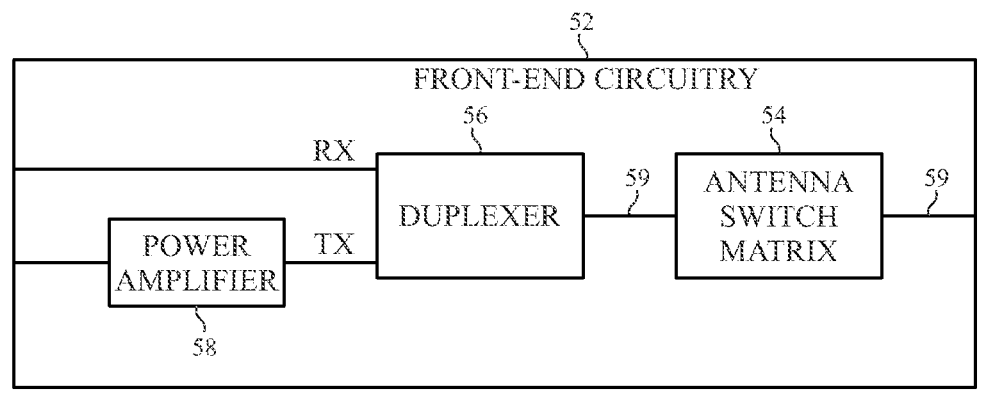
FIG. 8 is a schematic block diagram an embodiment of front end circuitry coupled to a transceiver in the electronic device of FIG. 1.

FIG. 8 illustrates a block diagram of example components that may be part of the front-end circuitry 52. As shown in FIG. 8, the front-end circuitry 52 may include an antenna switch matrix 54, duplexer 56, and a power amplifier 58. The antenna switch matrix 54 may coordinate the transmission and reception of signals from and to the electronic device 50 via multiple antennas. That is, for example, the electronic device 50 may include multiple antennas (e.g., four, six) that may be used to transmit and receive signals. The antenna switch matrix 54 may be a hardware or software component that enables the electronic device 50 to communicate with other devices via one or more of the antennas that may be present on the electronic device 50.

The duplexer 56 may coordinate the flow of data (e.g., signals) to and from the transceiver 28 via a communication line 59. The communication line 59 may be a transmission path that allows signals to be output by the electronic device 50 via an antenna or received by the electronic device 50 via the antenna. As data is received via the antenna switch matrix 54 and the communication line 59, the duplexer 56 may cause the flow of data to proceed towards the transceiver 28. On the other hand, when data is to be transmitted from the transceiver 28, the duplexer 56 may cause the flow of data to proceed toward the antenna switch matrix 54, which may use one of the multiple antennas to transmit the data.

The power amplifier 58 may be any suitable amplifier circuit that amplifies the signal output by the transceiver 28. The amplified signal may then be provided to the duplexer 56, which may forward the amplified signal to the antenna switch matrix 54 for transmission.

Figure 9:
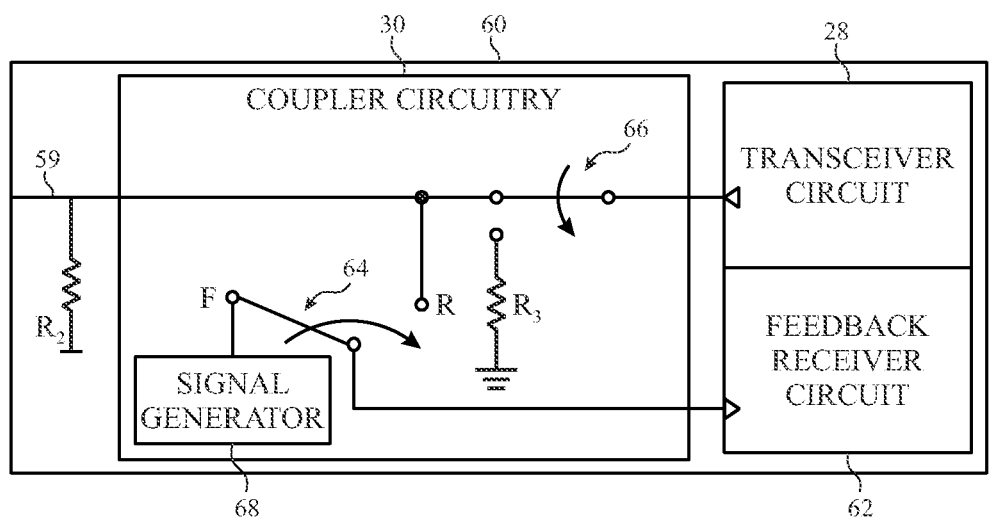
FIG. 9 is a schematic block diagram of an embodiment of the electronic device of FIG. 1 including a coupler circuitry for controlling the routing of signals transmitted and received via the electronic device.

In certain embodiments, the electronic device 50 may include the coupler circuitry 30 that may control the flow of data forward (e.g., for transmission) or reverse (e.g., for reception) based on whether a signal is designated for transmission or reception. For instance, FIG. 9 illustrates a block diagram of an example electronic device 60 that includes the coupler circuitry 30 that may route data to a feedback receiver circuit 62. As shown in FIG. 9, the coupler circuitry 30 may include two switches 64 and 66 that may control the route in which data (e.g., signals) are directed within the electronic device 60. In certain embodiments, the electronic device 60 may include a signal generator 68, which may generate a signal that is to be transmitted by the electronic device 60 (e.g., via front-end circuitry 52). Although not shown in FIG. 9, it should be noted that, in some embodiments, the electronic device 60 may include the front-end circuitry 52 described above.

The signal generator 68 may be a hardware or software component that may generate a signal that is to be transmitted by the electronic device 60. In some embodiments, the operations of the signal generator 68 may be performed by the processor 12 described above with reference to FIG. 1. In any case, when a signal to be transmitted is generated, the coupler circuitry 30 may operate in a forward (F) mode. As such, the switch 64 may be positioned to couple to the signal generator 68 to the feedback receiver circuit 62. In addition, the switch 66 may be positioned to couple the transceiver 28 to the output channel (e.g., antenna) of the electronic device 60.

The feedback receiver circuit 62 may include hardware or software logic elements that determine a difference or error between the signal generated by the signal generator 68 and an expected signal that corresponds to the generated signal. In one embodiment, the feedback receiver circuit 62 may receive a pre-defined reference signal that may be used to calibrate the transmission operations of the electronic device 60. As such, the signal generator 68 may generate a signal that corresponds to the pre-defined reference signal. The feedback receiver circuit 62 may then compare the generated signal to the pre-defined reference signal to determine an error signal that represents the differences between generated signal to the pre-defined reference signal. The error signal may be representative of a phase error between the two signals, an error vector measurement (EVM) between the two signals, a root-mean-square (RMS) power between the two signals, a spectral analysis (e.g., IQ domain, Fast-Fourier Transform (FFT)) with respect to the two signals, and the like.

After determining the error signal between the generated signal and the expected signal, the transceiver 28 may determine a compensation or adjustment factor (e.g., amplitude, phase adjustment) that it may apply to the generated signal, such that the generated signal more closely matches the reference signal. The transceiver 28 may apply this compensation factor to each of the signals that it receives for transmission. After adjusting the generated signal, the transceiver 28 may transmit the adjusted signal via the switch 66 and one or more antennas of the electronic device 60. In some embodiments, the electronic device 60 may include a load resistor R2 that may facilitate the transmission and reception of signals via the electronic device.

Figure 10:
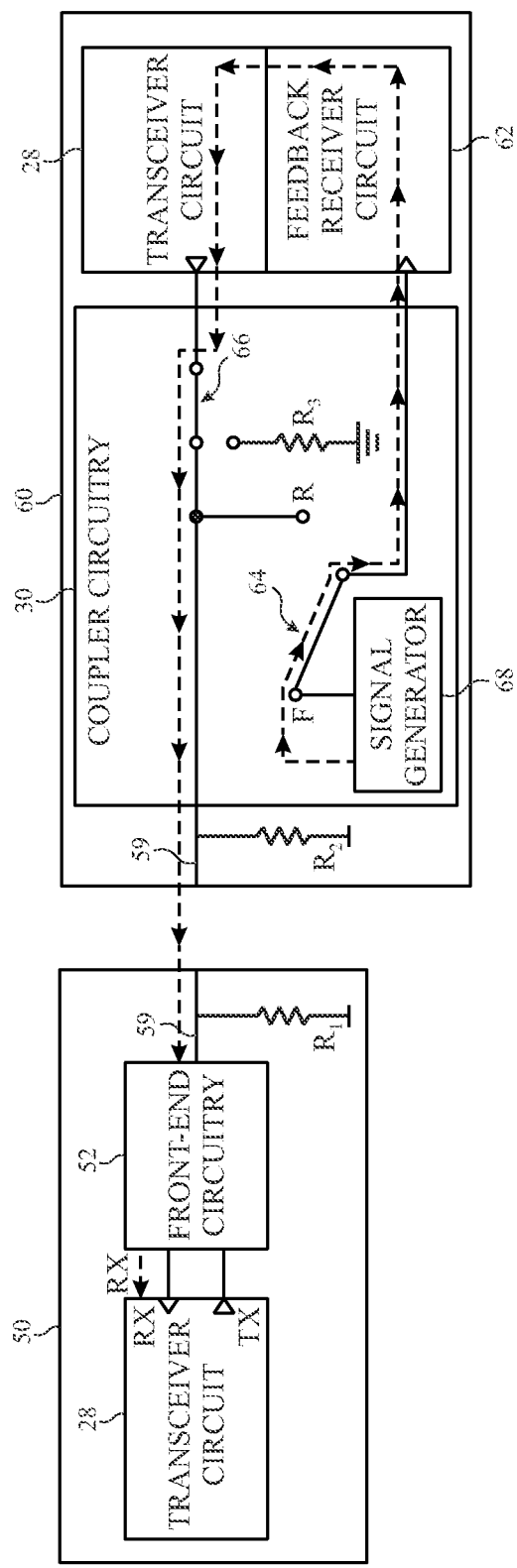
FIG. 10 is a schematic diagram illustrating the transmission of a signal generated by the electronic device of FIG. 1 to another electronic device.

With the foregoing in mind, FIG. 10 illustrates a path that the generated signal may traverse when being transmitted by the electronic device 60 to the electronic device 50. By way of the example depicted in FIG. 10, the generated signal may originate from the signal generator 68 and propagate to the feedback receiver circuit 62 via the switch 64. The feedback receiver circuit 62 may provide the generated signal and an error signal to the transceiver 28, which may adjust the generated signal. In some embodiments, the feedback receiver circuit 62 may also adjust the generated signal based on the error signal described above.

The transceiver 28 may then output the adjusted signal to the output port (e.g., antenna) of the electronic device 60 via the switch 66. The signal transmitted by the electronic device 60 may then be received by the electronic device 50 described above.

In addition to transmitting signals, the electronic device 60 may also receive signals transmitted from other suitable devices (e.g., electronic device 60). In some embodiments, the electronic device 60 may be configured to operate as a testing device to determine the quality of signals received from other sources. In some situations, a separate testing device is used to determine the quality of received signals. That is, a dedicated device that receives signals, analyzes the signals, and determine certain quality metrics concerning the signals are used during the testing and manufacturing of electronic devices.

Keeping this in mind, as discussed above, in some embodiments, the electronic device 10 of FIG. 1 (or variations thereof, as shown in FIGS. 2-6) may use the coupler circuitry 30 to route received signals and assess the quality of the received signals. In this way, the electronic device 10 may be used to perform quality performance and manufacturing testing, and a dedicated or separate testing device for assessing the quality of the received signals.

Figure 11:
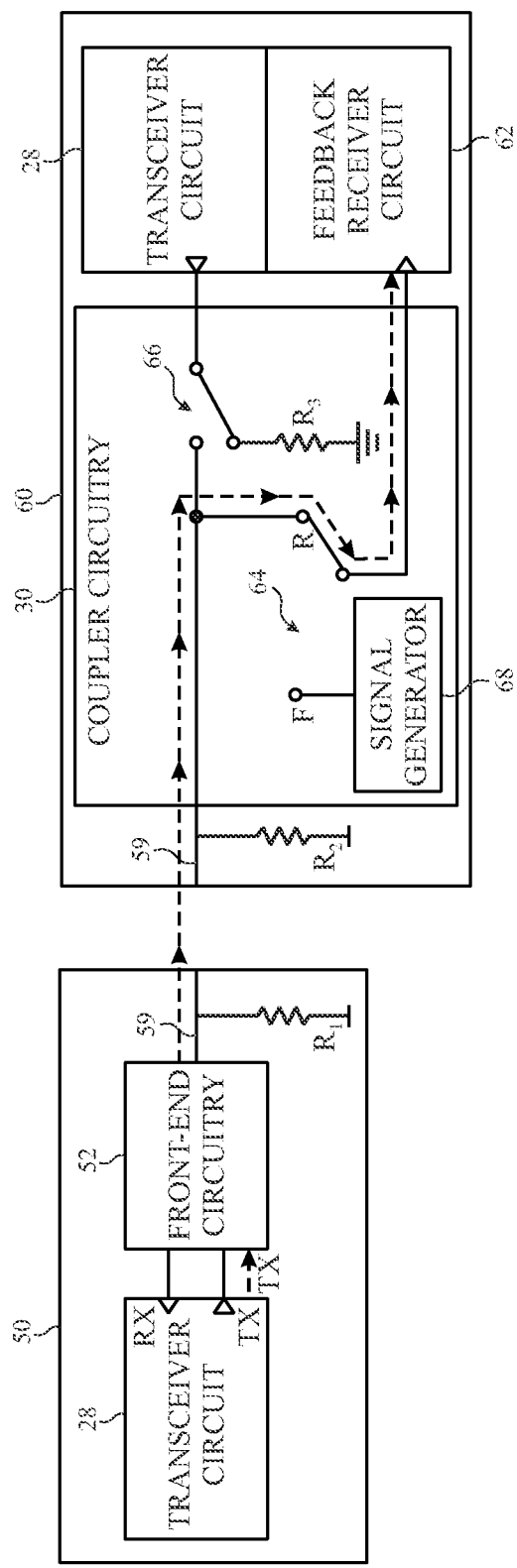
FIG. 11 is a schematic diagram illustrating the reception of a signal by the electronic device of FIG. 1 from another electronic device.

To illustrate how the coupler circuitry 30 may route the received signal to the feedback receiver circuit 62, FIG. 11 depicts a schematic diagram of the communication path from the electronic device 50 to the electronic device 60 via the coupler circuitry 30. As shown in the example presented in FIG. 11, the electronic device 50 may transmit a signal to the electronic device 60 via one or more antennas or the like. The signal may be a test signal that includes one or more waveforms that may be interpretable by the electronic device 60. When the signal is transmitted from the electronic device 50, the signal may be reduced or attenuated by the medium (e.g., air, noise) in which the signal is transmitted. As such, when the electronic device 60 receives the signal transmitted by the electronic device 50, the signal may be attenuated, as compared to the originally transmitted signal.

In certain embodiments, the attenuation factors of the medium may be known and a reference signal that represents an expected received signal based on the transmitted signal may be determined based on the known attenuation factors. That is, when performing the testing operations, the electronic device 50 may transmit a known test signal in a controlled environment with known attenuation factors. The reference signal may represent the signal that is to be received by the electronic device 60 in this controlled environment. As will be described in more detail below, the feedback receiver circuit 62 may use the reference signal to determine the quality parameters or metrics of the received signal.

Referring back to FIG. 11, after receiving the signal transmitted from the electronic device 50, the coupler circuitry 30 of the electronic device 60 may route the received signal to a reverse (R) path that directs the received signal to the feedback receiver circuit 62 described above. That is, the coupler circuitry 30 may adjust the position of the switch 64 to cause the received signal to couple to the feedback receiver circuit 62. In certain embodiments, the feedback receiver circuit 62 may determine an error between the received signal and the reference signal that corresponds to the expected signal received by the electronic device 60 based on the expected attenuation factors and the signal originally transmitted by the electronic device 50. Based on the received signal, the feedback receiver circuit 62 may determine a phase error of the received signal, an RMS power of the received signal, a spectrum of the received signal, the EVM of the received signal, and the like. In other words, the feedback receiver circuit 62 may analyze the quality of the signal transmitted by the electronic device 50 and the quality of the signal received by the electronic device 60. In certain embodiments, the quality of the signal may be measured based on the phase error between the received signal and the reference signal, based on the EVM between the received signal and the reference signal, based on a cross correlation between the received signal and the reference signal, or the like.

After analyzing the received signal, the feedback receiver circuit 62 may send the error signal to the transceiver 28 as described above. To ensure that the transceiver 28 does not transmit another signal, the coupler circuitry 30 may adjust the position of the switch 66 to couple the output of the transceiver 28 to a load resistor R3. The load resistor R3 may dissipate the energy of the signal output by the transceiver 28. As such, the coupler circuitry 30 may enable the electronic device 60 to both transmit signals and assess the quality of signals received from other devices using the same feedback receiver circuit 62.

Figure 12:
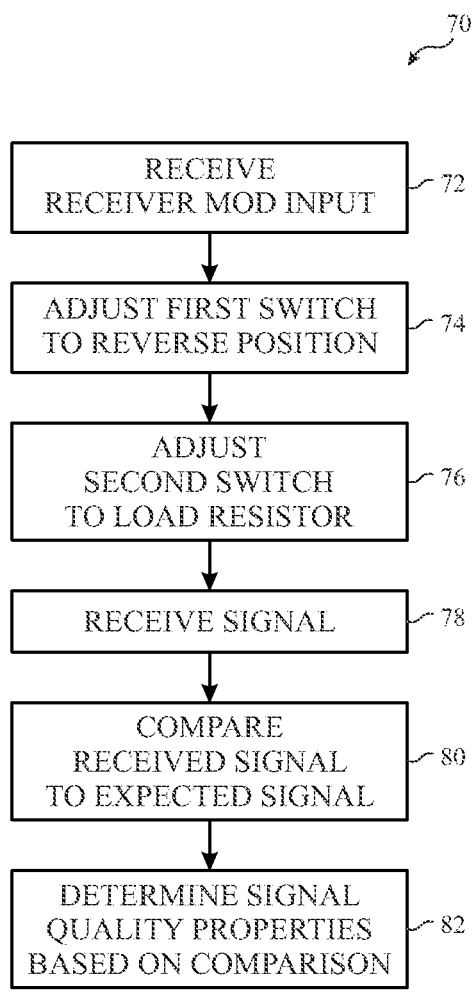
FIG. 12 is a flow chart of a method for receiving signals via coupler circuitry of the electronic device of FIG. 1, in accordance with an embodiment.

With the foregoing in mind, FIG. 12 illustrates a flow chart of a method 70 for the electronic device 60 to transition from a transmission mode in which the electronic device 60 may transmit signals to a receive mode in which the electronic device 60 may assess the quality of received signals. In certain embodiments, the method 70 may be performed by the processor 12, which may be communicatively coupled to the various components described above as being part of the electronic device 60. However, it should be noted that the method 70 may be performed by any suitable device. Additionally, although the method 70 is presented in a particular order, it should be noted that the method 70 may be performed in any suitable order.

Referring now to FIG. 12, at block 72, the processor 12 may receive a receiver mode input from a user. That is, a user operating the electronic device 60 may provide an indication via the input structures 22 requesting that the electronic device 60 enter a receive mode that enables it to assess the quality of received signals. Alternatively, the electronic device 60 may be in a transmission mode that enables the electronic device 60 to transmit signals and receive signals from other devices. However, when in the transmission mode, the electronic device 60 may route the received signal to the transceiver 28, which may be coupled to the processor 12.

After receiving the receiver mode input, at block 74, the processor 12 may cause the switch 64 to move to a reverse (R) position that may enable received signals to route to the feedback receiver circuit 62, as illustrated in FIG. 11. At block 76, the processor 12 may adjust the switch 66 to couple the output of the transceiver 28 to the load resistor R3, as illustrated in FIG. 11.

At block 78, the processor 12 may receive the signal transmitted from another device. After receiving the signal, the received signal is routed to the feedback receiver circuit 62 via the switch 64 as described above. In certain embodiments, the processor 12 may interact with the feedback receiver circuit 62 to compare the received signal to the reference or expected signal, at block 80.

Based on the comparison between these two signals, the processor 12 may, at block 82, determine signal quality properties associated with the received signal. That is, as mentioned above, the processor 12 may use the comparison between these two signals may to determine a phase error, an EVM, or the like. In some embodiments, the signal quality properties may be presented via the display 18, transmitted to the device that transmitted the signal, stored in the storage 16, transmitted to a third-party device, or the like. The device that transmitted the signal may use the signal quality properties to adjust certain properties of its circuitry to improve the signal quality properties.

In some embodiments, the processor 12 may receive a transmission mode command to indicate that the electronic device 10 should be configured to now transmit data. In this case, the processor 12 may adjust the positions of the switch 64 and the switch 66, such that they enable the electronic device 10 to transmit signals, as shown in FIG. 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
   a feedback circuit configured to determine an error associated with a first signal to be transmitted to a second electronic device separate from the electronic device, wherein the first signal is produced by a signal generator;
   a transceiver configured to:
      adjust the first signal based on the error; and
      send the adjusted first signal to the second electronic device; and
   coupler circuitry configured to:
      route the first signal from the signal generator to the feedback circuit; or
      route a second signal received from the second electronic device or a third electronic device separate from the electronic device to the feedback circuit, wherein the feedback circuit is configured to determine an additional error associated with the second signal.

2. The electronic device of claim 1, wherein the feedback circuit is configured to determine the error based on a comparison of the first signal to a reference signal representative of the first signal.

3. The electronic device of claim 1, wherein the transceiver is configured to adjust the first signal by modifying an amplitude of the first signal, modifying a phase of the first signal, or both.

4. The electronic device of claim 1, wherein the coupler circuitry comprises a first switch configured to route the second signal from an antenna of the electronic device to the feedback circuit when in a first position.

5. The electronic device of claim 4, wherein the first switch is configured to couple the signal generator to the feedback circuit when in a second position.

6. The electronic device of claim 4, wherein the coupler circuitry comprises a second switch configured to couple an output of the transceiver to a load resistor when the first switch is in the first position.

7. The electronic device of claim 6, wherein in the load resistor is configured to couple to ground.

8. The electronic device of claim 1, comprising front-end circuitry configured to select one or more antennas of the electronic device to use to transmit the first signal, control a direction of data flow to or from the transceiver, amplify the first signal before being transmitted, or any combination thereof.

9. A circuit, comprising:
   a first switch configured to couple a first signal generated by a signal generator to a feedback circuit or couple a second signal received by an electronic device to the feedback circuit, wherein the feedback circuit is configured to determine a first error between a first reference signal and the first signal or a second error between a second reference signal and the second signal; and
   a second switch configured to couple a transceiver to an antenna of the electronic device or couple the transceiver to a load resistor configured to couple to ground.

10. The circuit of claim 9, wherein the first switch is coupled to the signal generator and the feedback circuit when the second switch is coupled to the antenna and the transceiver.

11. The circuit of claim 9, wherein the second switch is coupled to the signal generator and the feedback circuit when the second switch is coupled to the antenna and the transceiver.

12. The circuit of claim 9, wherein the second reference signal is determined based on one or more attenuation factors associated with a medium in which the second signal traverses before being received by the electronic device.

13. The circuit of claim 9, comprising an amplifier configured to amplify the first signal prior to being transmitted by the electronic device via the antenna.

14. The circuit of claim 9, wherein the transceiver is configured to adjust the first signal based on the first error prior to transmitting the first signal via the antenna.

15. A method for operating a coupler in an electronic device, comprising:
   receiving, via at least one processor, a receive mode input indicative of the electronic device receiving a first set of signals from another electronic device;
   adjusting, via the at least one processor, a first position of a first switch to couple a communication line configured to receive the first set of signals to a feedback receiver circuit configured to determine an error between an expected signal and the first set of signals input to the feedback receiver circuit;

adjusting, via the at least one processor, a second position of a second switch to couple a transceiver circuit configured to output an adjusted set of signals to a load resistor coupled to ground;

determining, via the at least one processor, one or more properties associated with the first set of signals based on the error between the expected signal and the first set of signals; and displaying, via the at least one processor, the one or more properties via an electronic display.

16. The method of claim 15, wherein the one or more properties comprises a phase error, a root-mean square (RMS) power, an error vector measurement (EVM), or both.

17. The method of claim 15, comprising:

receiving, via the at least one processor, a transmission mode input indicative of the electronic device transmitting a second set of signals;

adjusting, via the at least one processor, the first position of the first switch to couple a signal generator to the feedback receiver circuit in response to receiving the transmission mode input; and adjusting, via the at least one processor, the second position of the second switch to couple the transceiver circuit to an antenna in response to receiving the transmission mode input.

18. The method of claim 15, wherein the feedback receiver circuit is configured to determine the error based on a cross correlation between the expected signal and the first set of signals.

19. The method of claim 15, wherein the expected signal is predefined based on the first set of signals.

20. The method of claim 15, wherein the electronic device comprises a handheld device.

\* \* \* \* \*